Sept. 10, 1968 J. M. LEACH 3,400,806
ARTICLE HANDLING CONVEYORS
Filed April 10, 1967 2 Sheets-Sheet 1
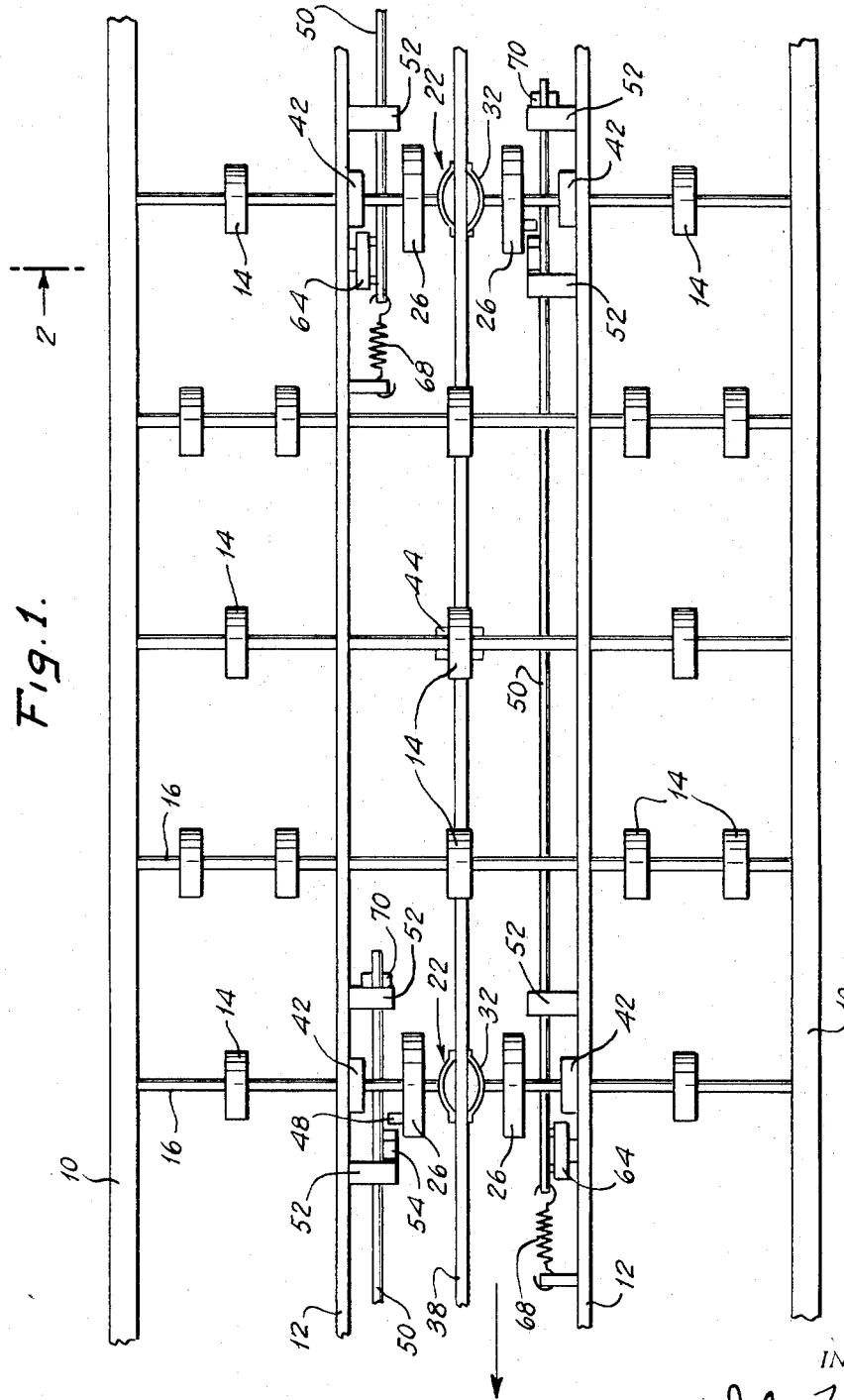
INVENTOR.
John M. Leach

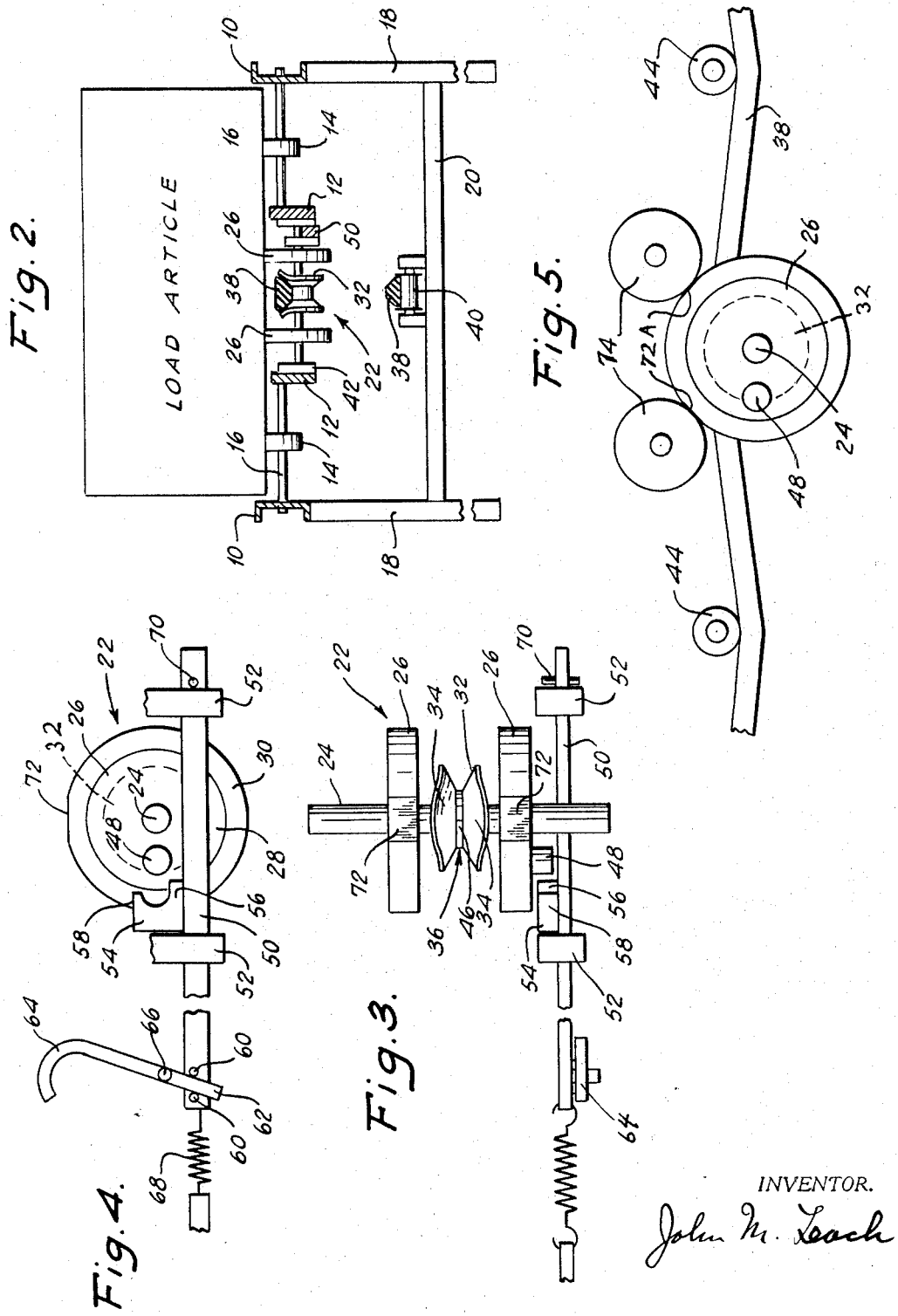

United States Patent Office 3,400,806
Patented Sept. 10, 1968

3,400,806
ARTICLE HANDLING CONVEYORS
John M. Leach, P.O. Box 341, Belle Terre,
Port Jefferson, N.Y. 11777
Filed Apr. 10, 1967, Ser. No. 629,808
10 Claims. (Cl. 198—127)

ABSTRACT OF THE DISCLOSURE

This invention relates to power driven article conveyors of the type wherein articles are supported from beneath and propelled by a series of spaced combined article supporting and moving elements which are suitably driven. A series of control elements are also spaced along the conveyor and each is operable by the presence of an article to stop the driving action of an article moving element located behind the article operating the control element relative to the direction of article movement so that an article located behind the control operating article cannot be moved into forcible contact with said last named article.

---

When an article moving element is stopped by a given control, it is also preferably locked so that any article supported by it can not move either forward or backward which makes it possible to operate the conveyor of the present invention on an incline or decline when desired and the articles will not move either ahead or backwards by their own weight.

It is an object of the present invention to provide an article conveyor on which articles can be accumulated even though the lead article is stopped without crowding the articles into a tight mass and which is still of very simple construction and economical to manufacture.

It is another object of the present invention to provide an article conveyor which will not tightly crowd the articles together even though they vary considerably in weight and which requires no weight or other adjustment preliminarily to use, or during use.

It is an object of the present invention also to provide an article conveyor which will accumulate articles without tightly crowding even though an article is stopped which can be used in a horizontal inclined or declined position.

It is a further object of the present invention to provide an article conveyor which will accumulate articles without tightly crowding them together and employs a band type driving element which travels in a substantially constant path at all times and thereby does not undergo constantly varying tension.

It is a further object of the present invention to provide an article conveyor which will accumulate articles without tightly crowding them together, employs a band type driving element, and a movement transmission device for transmitting movement from the band to the articles which actually clutches the band instead of merely contacting it.

It is another object of the present invention to provide an article conveyor having article supporting and moving elements which can be completely stopped and locked in stopped position when an article is stopped.

Other objects and advantages of the present invention will become apparent to those skilled in the art upon recourse to the following specification and drawings, in which:

FIG. 1 is a fragmentary plan view of one type of article conveyor constructed in accordance with the present invention;

FIG. 2 is a cross sectional view taken substantially on the plane indicated by line 2—2 of FIG. 1 and looking in the direction of the arrows;

FIG. 3 is a plan view of motion transmission and article supporting and moving elements of the present invention shown on an enlarged scale and disassociated from the remainder of the structure in order to more clearly disclose these elements;

FIG. 4 is an elevational view of the elements shown in FIG. 3, and

FIG. 5 is a fragmentary elevational view of the elements of a different type of article conveyor constructed in accordance with the present invention.

The conveyor of the present invention shown in FIGS. 1 and 2 comprises a frame made up of two side members 10 and two intermediate stringers 12. Freely rotatable wheels 14 are supported and held in suitably spaced relationship by through shafts 16. The smaller the articles conveyed the more wheels appearing in a square foot area is the general rule. It will be understood that these wheels provide a support or partial support for the articles being conveyed but do not within themselves impart any movement to the supported articles. Suitable legs 18 connected by a cross-tie 20 are provided at desired intervals.

Combined article supporting and moving element and movement transmission element units 22 are positioned along the frame at desired points. In general, the smaller the articles to be moved the closer together the separate units 22 will be placed. Each unit 22 consists of a shaft 24 which has two article supporting and movement element wheels 26 and a clutch member 32 suitably fastened to it for movement therewith, see FIGS. 3 and 4. Each wheel 26 is preferably formed of a solid inner section and a friction producing rim or tire formed of rubber or a suitable plastic 30.

The clutch member 32 is shaped very similarly to a V-pulley in that it has a symmetrically formed V area 36 but at one area in its circumference the sides forming the V are opened outwardly slightly as shown at 34 for a purpose to be described later. This slight distortion of the sides 34 is not sufficient to disturb the rotational balance of the clutch member 32.

A powered driving element 38 in endless band form and having a cross sectional shape very similar to a V-belt to fit snugly into the V area 36 of the clutch members 32 is carried on its top run by the clutch members 32 as shown in FIGS. 1 and 2. The bottom run of 38 is suitably supported at desired intervals by rollers 40 suitably mounted for rotation on the cross ties 20. Each of the shafts 24 is suitably journaled in bearings 42 which are preferably frictionless and suitably mounted on the stringers 12.

It will be understood that the frame formed of the side rails 10, etc. can be as long as desired and when the driving element 38 moves in the direction of the arrow shown in FIG. 1 a suitable driving sheave (not shown) will support element 38 at the arrow end of the frame and a suitable take-up sheave (not shown) will support it at the opposite end of the frame. A suitable prime mover also not shown will drive the driving sheave. These latter elements in and of themselves from a detailed standpoint are not a part of the present invention and have been omitted from the drawings in order to more clearly show the details of the present invention.

To insure that the driving element 38 seats well down into the V sides of the clutch members 32, suitable holddown rollers 44 are suitably mounted along the frame, for example, one intermediate each two assemblies 22. If desired, the roller 44 mountings can be made vertically adjustable so that the degree of wrap of the driving element 38 on each clutch member can be varied to thereby vary the power transmitted from the driving element 38 to each clutch member 32.

The shafts 24 are mounted at such elevation that the top areas of the wheels 26 are slightly higher than the tops of the wheels 14 so that any article, for example as shown in FIG. 2, placed on the top of the conveyor will always fit tightly down onto the wheels 26. The distance between each set of wheels 26 is normally selected so that each article placed on the conveyor will just ride onto one set of wheels as it leaves the preceding set of wheels. If smaller articles should be placed on the conveyor they will push each other from one set of wheels 26 to the next set.

As the powered driving element 38 passes over the V area of each clutch element 32 it will impart a strong rotating force to each clutch element and thus rotate the connected wheels 26 to move articles along the conveyor. When the driving element 38 passes into the area 46 where the sides 34 have been slightly moved apart the rotational force imparted to the clutch member will be considerably reduced but the frictional contact between element 38 and clutch 32 coupled with the natural momentum of the unit 22 will be sufficient to carry the clutch element through the area 46 until the element 38 is again tightly clutched by the sides of the V area 36 to impart the strong rotating force to the clutch element 32. The sides at the widened point 34 are smoothly shaped so that the transition of the driving element 38 from the V area 36, through the widened area and back again into the V area 36 is smooth and not accompanied by any substantial up and down vibratory movement which would vary the tension on the element 38 and thereby vary its force transmitting power.

In order to avoid tight jamming, as distinguished from light contacting, between articles being conveyed, provision is made to stop rotation of any set of wheels 26 when an article is for any reason stopped or resting on the set of wheels preceding said set. To this end each set of wheels 26 is provided with a projection 48 on one wheel or the other. This projection 48 is placed at a point approximately ninety degrees removed from the widened area 46 on the clutch member 32 as shown in FIGS. 3 and 4. A slide 50 is mounted for horizontal movement in suitable supports 52 suitably attached to the stringers 12. Each slide is positioned so that the projection 48 misses it as the projection rotates with the wheel 26 to which it is attached. Each slide 50 carries a stop element 54 having a long bottom projection 56 and a shorter top projection 58. Each slide 50 at its forward end is provided with two separated studs 60 which straddle the short end 62 of a package or article operable lever 64 suitably pivoted at 66 on a stringer 12. A tension spring 68 normally holds the slide 50 in the position shown in FIG. 4 where the stop 54 is not in contact with the projection 48 and a pin 70 carried by the slide 50 is up against a slide support 52.

The lever 64 is preferably positioned near a set of wheels 26 on the downstream side as shown, but is effective to stop rotation of the next set of wheels upstream as shown in FIG. 1. With this arrangement, when an article is operating the lever 64 adjacent one set of wheels, the next set of wheels upstream can not advance another article towards the first mentioned article until it rides off the lever 64. This sequence of wheel operation and stoppage is repeated automatically all along the full length of the conveyor which positively prevents tight crowding of the series of articles together at all times.

When a set of wheels 26 is stopped as above explained, the stop element 54 will be moved so that the lower projection 56 prevents rotation of the wheels 26 in a counterclockwise direction as viewed in FIG. 4 and the upper projection 58 will extend above the wheel projection 48 so that the wheels 26 also cannot turn in a clockwise direction. This means that any article resting on a set of wheels 26 so stopped will be prevented by the friction presented by the stopped wheels from moving by gravity down any decline on which the conveyor may be setting within the degree normally used for gravity conveyors. The degree of friction presented by the stopped wheels need not be great.

Under some conditions, for example where the articles may be heavier in the front end than in the rear end or spanning two sets of wheels 26, it may be found desirable to lessen or even eliminate the friction on an article exerted by stopped wheels 26 relative to the friction exerted by rotating wheels, which can be done by very slightly flattening the tops of the wheels 26 when they are in stopped position as shown at 72 in FIG. 4. This slight flattening is preferably not sufficient to eliminate all friction exerted upon the contacting article so that the article will still be held when the conveyor is setting on a slope, but is sufficient to enable the friction exerted by a rotating set of wheels 26 for example to move an article far enough over a stopped set of rollers to operate the adjacent lever 64. Also, the reduction in friction created by the flat 72 is an aid to the starting of stopped set of wheels under an article when the article down stream from it moves off the particular lever 64 which is stopping the wheels under that particular article.

When a set of wheels 26 is stopped by an article, whether there is another article setting on the stopped wheels or not the driving element 38 will pass through the widened area 46 freely and exert a minimum of rotating force on the clutch member 32 involved but just enough so that when the article causing the wheel stoppage passes off the lever 64 involved and the stop 54 withdraws from under the stop member 48, the clutch member 32 will be rotated the very small amount required to enable the V section 36 of the clutch member 32 to again firmly clutch the driving element 38 and again very positively rotate the clutch member 32 and thus advance any article above this particular clutch member through the wheels 26.

Where it is desired to substantially increase the moving action imparted to the articles by the wheels 26, the units 22 can be placed close together and several can be controlled simultaneously by extending the slide 50 as required and providing it with a stop member 54 for each unit 22.

Where it is desired to use a roller type supporting conveyor instead of a wheel type, the wheels 14 can be suitably replaced by well known types of rollers 74 as shown in FIG. 5 and units 22 will be spaced as desired but so that each pair of wheels 26 drives two rollers 74. The hold-down rollers 44 will also preferably be used with the roller bed as explained for the wheel bed. The operation of the units 22 on the roller type conveyor will be the same as on the wheel type as explained above.

As in the former modification, the wheels 26 may be provided when desired with flats 72A as shown in FIG. 5 to lessen or eliminate friction between the wheels 26 and rollers 74 to enable articles to coast lightly together and facilitate starting of the wheels 26 by the band 38.

It is preferred that the stopping arrangements for the movement transmission element assemblies 22 be alternated from one side of the conveyor to the other as shown in FIG. 1 in order to conserve space.

In the event there should be any tendency on the part of the band 38 to drop slightly when passing through the widened area 46 so as to place a slight vibration up and down in the band member, this can be avoided by raising the bottom portion of the area 46 so that the band 38 can not drop and thereby eliminate the up and down movement of the band 38. This vibration is undesirable because it tends to vary the tension in the band and thus vary the degree of grip between the elements 32 and 38.

It will be noted that if an article should be stopped at any point on the conveyor for any reason even through the article ahead of it should continue to move ahead, the wheels 26 under the stopped article would turn under the action of the band 38 until a widened area 46 on the clutch element 32 for the wheels under the stopped article passes under the band 38 and these wheels will then stop because of the friction exerted by the stopped article and the lack of gripping action on the band 38 exerted by the widened area 46. The lever 64 operated by the stopped article will then stop the movement of the next following article and so on along the line of articles. When the stoppage of the article in question is eliminated, the wheels 26 under that article will be turned sufficiently by the frictional force exerted on the clutch member 32 by the band 38 passing through the widened area 46 to turn the clutch member 32 the slight amount required to bring the V area again into clutching engagement with the element 38 and thus move the stopped article along at the prescribed rate.

The foregoing is to be considered as descriptive and not limitative because many changes can be made in the details specified without departing from the spirit of the invention.

The invention having been described, what is claimed is:

1. A conveyor for articles comprising a frame, rotatable article supporting and moving elements mounted on said frame, a powered driving element continuously movable in a given path always free of contact both with said rotatable article supporting and moving elements and the articles being conveyed, movement transmission means for transferring movement from said powered driving element to at least one of said rotatable article supporting and moving elements and being permanently operatively connected to said one of said rotatable article supporting and moving elements and said powered driving element, the connection between said movement transmission means and said powered driving element being frictional, and means operable by any article being moved by said article supporting and moving elements when in a selected position to both positively stop all movement of the entire one of said movement transmission means effective upon at least a selected one of said article supporting and moving elements located behind said any article relative to the direction of article movement as well as to stop rotation of said selected one of said article supporting and moving elements and also reduce frictional engagement between said stopped movement transmission means and said powered driving element at the point of contact therebetween.

2. A conveyor for articles as specified in claim 1 in which the powered driving element comprises a V-belt.

3. A conveyor for articles as specified in claim 2 in which the movement transmission means includes a V-pulley driven by said V-belt and in which the sides of said pulley forming the V are spread farther apart over a given circumferential area than over the remainder of the circumference of said pulley whereby the said V-belt will slide through the widened area while exerting slight turning force on said V-pulley when the latter is stopped in a position where said V-belt passes through said widened area.

4. A conveyor for articles as specified in claim 3 in which said means for positively stopping all movement of said movement transmission means is capable of operation only when said V-belt is passing through said widened area on the circumference of said V-pulley.

5. A conveyor for articles as specified in claim 1 in which said means for positively stopping all movement of said movement transmission means also locks said movement transmission means in stopped position so that any article whose motion is stopped by the stopping of said movement transmission means can not move due to the force of gravity either ahead or backwards.

6. A conveyor for articles as specified in claim 3 in which said V-belt travels in a substantially fixed path at all times so that it is not subjected to variations in tension caused by a variable path.

7. A conveyor for articles comprising a frame, rotatable article supporting and moving elements mounted on said frame, a power driven V-belt extending adjacent said rotatable article supporting and moving elements, means including a V-pulley driven by said V-belt for driving each of said elements, and each of said V-pulleys having a section of the circumference in which the sides forming the V of the pulley are spread farther apart than over the remainder of the circumference to provide a belt slippage area which becomes active whenever an article is stopped on the article supporting and moving elements associated with a given V-pulley.

8. A conveyor for articles as specified in claim 7 further characterized by means operable by an article being conveyed for stopping at least a given one of said V-pulleys.

9. A conveyor for articles as specified in claim 8 in which the said stopping means is operable only by an article located downstream of the V-pulley which is stopped relative to the direction of package or article flow.

10. A conveyor for articles as specified in claim 9 in which said article operable stopping means can be operated only when said widened area in the circumference of the V-pulley is in contact with the V-belt.

References Cited

UNITED STATES PATENTS 3,062,359  11/1962  McGow _____ 198—160

RICHARD E. AEGERTER, *Primary Examiner.*